Dec. 20, 1966   F. J. MARSEE ETAL   3,292,896
CARBURETOR FUEL INLET VALVE
Filed April 27, 1964

FREDERICK J. MARSEE
ROBERT G. LANE
INVENTORS

BY
Walter Potrosko, Jr.

United States Patent Office 3,292,896
Patented Dec. 20, 1966

3,292,896
CARBURETOR FUEL INLET VALVE
Frederick J. Marsee, Hazel Park, and Robert G. Lane, Detroit, Mich., assignors to Holley Carburetor Company, Warren, Mich., a corporation of Michigan
Filed Apr. 27, 1964, Ser. No. 362,643
2 Claims. (Cl. 251—122)

This invention relates generally to carburetors for internal combustion engines, and more particularly to the fuel inlet system therefor.

Most automotive carburetors include a fuel reservoir or float chamber in which a constant fuel level must be maintained by means of a float-operated inlet valve in order to maintain the required fuel metering head. That is, the fuel inlet to the carburetor float chamber includes a valve seat and a valve operated by a float that is positioned by actual fuel level so as to close the valve when the required level is attained. The size, and therefore the buoyant force, of the float is at least in part controlled by the size of the float chamber. This, in turn, controls the area of the valve seat, since the float must have sufficient buoyant force to maintain the valve closed against the pressure of the fuel supplied by the fuel pump. Thus, it is always desirable to increase the efficiency of the fuel inlet valve system so as to obtain maximum flow through a lesser valve seat area.

Accordingly, an object of this invention is to provide a more efficient fuel inlet valve system than that which has been heretofore employed. This and other objects of the invention will become more apparent upon examination of the following specification and accompanying drawings wherein.

Figure 1:
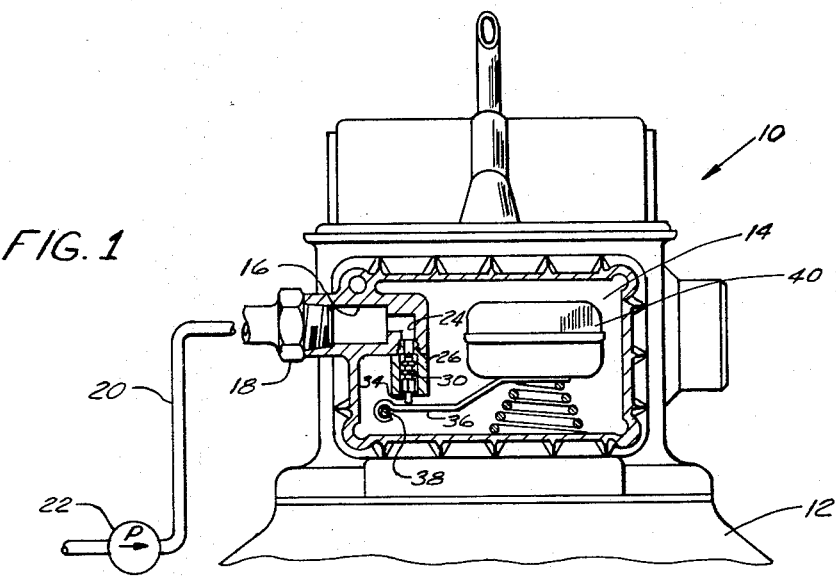
FIGURE 1 is a side elevational view of a typical carburetor, with portions thereof cut away and in cross-section to illustrate the fuel inlet system.

Referring now to the drawings in greater detail, FIGURE 1 illustrates a typical carburetor 10 mounted on the intake manifold 12 of an internal combustion engine. As usual, the carburetor 10 is formed to provide a fuel reservoir chamber 14 adjacent one side thereof. One wall of the chamber 14 is formed to provide a fuel inlet passage 16 adapted to receive a fitting 18 to which is connected the fuel line 20 extending from the pump 22. In the particular structure shown, the fuel inlet passage 16 communicates with a somewhat reduced diameter passage 24 which extends downwardly and is internally threaded to receive the separate, externally threaded valve seat member 26 which is usually formed as a cylindrical body.

The valve seat member 26 is formed from one end thereof with an axial cylindrical cavity 28 adapted to receive a valve 30, which in this case is shown as a square construction having grooves 32 formed therein to receive any foreign particles in the fuel that would otherwise interfere with valve operation. The lower end of the valve 30 has a portion 34 to engage the arm 36, which is pivoted at 38 and the other end of which is secured to the float 40, the valve being restrained from inadvertent removal by a ring 42, which may also serve as a baffle to limit discharge of fuel through the cavity 28.

The upper end of the valve 30 is formed with a conical tip 44, the present practice in some cases being to form this tip from some fuel-resistant, resilient material such as Viton. The upper end of the valve seat member 26 is formed with an axial passage 46 that is of lesser diameter than the cavity 28 so as to provide a valve seat 48. When a Viton tip is employed, it has been found that a 70° cone angle provides the best sealing without sticking in the valve seat 48.

Figure 3:
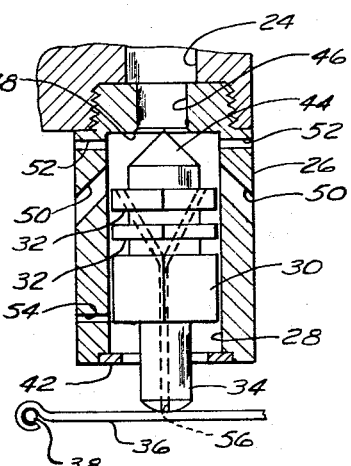
FIGURE 3 is a view similar to FIGURE 2, except that FIGURE 3 illustrates the less efficient prior art structure including openings for pressure probes.

Looking now at FIGURE 3, the prior practice was to form the valve seat member 26 by merely drilling the cavity 28 and the passage 46 so that the valve seat 48 was formed by a 90° edge which may have a radius. It will be noted, when the valve is open as shown in FIGURE 3, that the inlet fuel flows past the valve tip and through the discharge openings 50 formed through that portion of the wall of the valve seat member defining the cavity 28. That is, while some fuel may flow past the square portion of the valve, the primary intended exit is through the side openings 50.

During the investigation of the possibility of increasing the efficiency of the prior art valve and seat assembly shown by FIGURE 3, which was found to flow 148 pounds solid (liquid) fuel per hour, certain pressure readings were taken with the valve open and with fuel flowing past the valve. For example, four drillings 52 were made 90° apart near the top of the valve seat member so as to enable the insertion of a pressure probe and recording the pressures existing at these points. These probes were numbered 1–4, but only two are shown in FIGURE 3. A fifth pressure probe was inserted in the drilling 54 near the bottom of the valve seat member. Still another pressure probe was inserted in the passage 56 extending axially through the valve and branching off to points between the valve tip 44 and the discharge passages 50.

Figure 2:
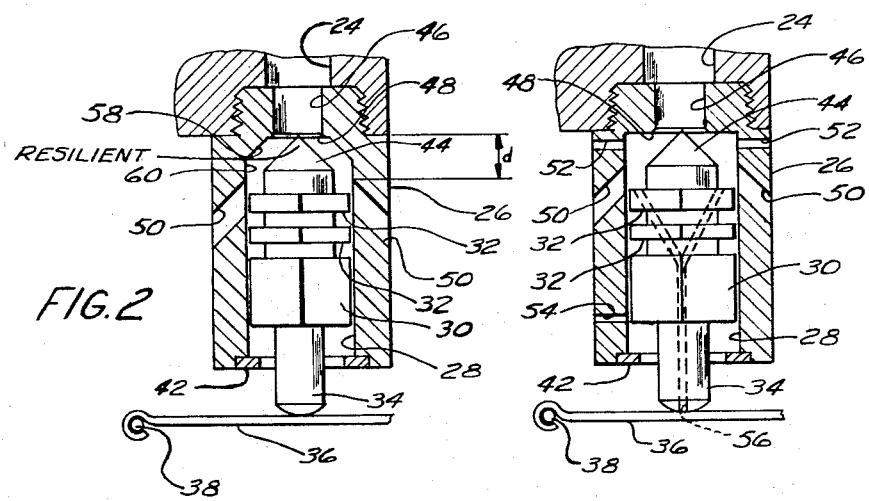
FIGURE 2 is an enlarged fragmentary view of the fuel inlet valve portion of FIGURE 1 to better illustrate the invention.

The above described pressure readings during fuel flow were taken for the prior art valve and seat assembly shown by FIGURE 3, as well as with a series of other valve and seat assemblies in which various design changes were made. FIGURE 2 illustrates a valve and seat assembly that represents the optimum design embodying the invention, although the pressure probe drillings are not shown. All common features, as between FIGURES 2 and 3, are identified with the same reference numerals. Most dimensions, such as the valve seat diameter (.110"), the cone tip angle (70°) and the diameter (.120") of discharge passages 50 were held constant during this investigation. The design details that were varied were the angle (45° and 60°) of the frustro-conical passage 58 connecting the cavity 28 and the passage 46, the angle (90°, 60° and 45°) of the openings 50 and the axial distance d (.068", .112", .139" and .209") of the openings 50 from the valve seat.

The specific problem requiring this investigation was a new engine application that required more fuel than the existing maximum valve seat diameter of .110" could apparently supply. In other words, the solution to the new requirement was either to increase the diameter of the valve seat and redesign the float system to provide sufficient buoyancy at higher pump pressures or to increase the efficiency of flow through the present valve seat.

The chart below gives the pressure readings of the structures shown by FIGURES 2 and 3, FIGURE 2 being the most efficient structure wherein the angle of the frustro-conical passage 58 and the discharge openings 50 was 45° from the axis of the cavity 28 and the distance $d$ was .112″–.139″. The pump pressure in this case was 3 p.s.i., although the FIGURE 2 structure also proved most efficient at 1 p.s.i. and 7 p.s.i.

*Pressure readings inside valve seat member*

| Probe Number | Probe Readings (Inches of Water) | |
|---|---|---|
| | Figure 2 | Figure 3 |
| 1 | 3.6″ vacuum | 0″ pressure. |
| 2 | 1.8″ vacuum | 0″ pressure. |
| 3 | 2.0″ vacuum | 0″ pressure. |
| 4 | 6.0″ vacuum | 2.0″ pressure. |
| 5 | 0″ pressure | 0″ pressure. |
| 6 | 10.0″ pressure | 3.0″ pressure. |

It will be noted from the chart that all of the pressures in the proposed construction of FIGURE 2 embodying the invention were considerably lower than those for the prior art construction shown by FIGURE 3. It was also noted that there was a significant difference in the efficiency of these two configurations; that is, as stated previously, the prior art structure flowed 148 lbs. of fuel per hour at 3 p.s.i. pump pressure, while the proposed configuration embodying the invention shown by FIGURE 2 flowed 178 lbs. of fuel per hour at the same pressure.

The theory behind the increased efficiency is not certain. However, it is known that higher flow velocity does result in a lower pressure; and the lower pressures in the FIGURE 2 structure are believed to be due to a greater flow velocity in the areas of the pressure probes. It would be expected, for example, that the more efficient structure would be one where the discharge openings 50 are in alignment with the surface of the frustro-conical passage 58, so as to provide a continuous flow path, rather than one having a step such as that existing at 60 of FIGURE 2. However, contrary to expectations, the test results indicate that the flow is affected by the position of the conical tip 44 when the valve is open in a manner so that a higher velocity and better efficiency is obtained by offsetting the discharge openings from the frustro-conical surface, although maintaining substantially the same angle, as shown in FIGURE 2.

As a result of the invention, the mere addition of the frustro-conical passage 58, which may be slightly offset from the seat 48 for ease of manufacture, and offsetting the discharge passages 50 increased the flow capacity of the prior art inlet valve 20%, thus avoiding any need to redesign the float system.

While the FIGURE 2 construction that was tested does involve particular dimensions and angles, it is believed that the invention is not limited to these particular values; rather, it appears that the increased flow efficiency is obtained due to the relationship of the discharge openings and the frustro-conical surface to each other and to the shape and position of the conical valve tip when the valve is open. For example, while the tip angle of the valve may be varied, an extension of a portion of the surface of the conical tip must intersect the adjacent end of the discharge passage.

While but one embodiment of the invention has been disclosed and described for purposes of illustration, other modifications may be possible within the scope of the appended claims.

What we claim as our invention is:

1. A carburetor fuel inlet valve assembly, comprising a valve seat member having a larger cylindrical valve cavity extending from one end thereof and a smaller axially aligned passage extending from the other end thereof, said smaller passage and said large cavity being joined by an intermediate frustro-conical passage having an angle on the order of 45° with respect to the axis of said cavity, the juncture of said smaller passage and said frustro-conical passage forming a valve seat having a diameter on the order of .110″, at least one discharge opening formed through the wall of said valve seat member at an angle substantially parallel to the angle of said frustro-conical section, the side of said opening nearest said seat intersecting said cavity at an axial distance of .112″–.139″ from said seat, and a valve positioned in said cavity, said valve having a resilient conical tip with a cone angle on the order of 70°.

2. A carburetor fuel inlet valve assembly, comprising a valve seat member having a larger cylindrical valve cavity extending from one end thereof and a smaller axially aligned passage extending from the other end thereof, said smaller passage and said large cavity being joined by an intermediate frustro-conical passage having an angle on the order of 45° with respect to the axis of said cavity, the juncture of said smaller passage and said frustro-conical passage forming a valve seat having a diameter on the order of .110″, at least one discharge opening formed through the wall of said valve seat member at an angle substantially parallel to the angle of said frustro-conical section, the side of said opening nearest said seat intersecting said cavity at an axial distance of .112″–.139″ from said seat, and a valve positioned in said cavity, said valve having a conical tip with a cone angle such that an extension thereof intersects said opening when said valve is open.

References Cited by the Examiner

UNITED STATES PATENTS

| 669,408 | 3/1901 | De Dion et al. | 123—139.16 |
| 824,214 | 6/1906 | Small | 137—434 X |
| 1,355,094 | 10/1920 | Ihrig | 137—434 X |
| 1,901,979 | 3/1933 | Meusy. | |
| 3,086,750 | 4/1963 | Carlson et al. | 137—434 X |

M. CARY NELSON, *Primary Examiner.*

ARNOLD ROSENTHAL, *Examiner.*